(12) United States Patent
Elkana

(10) Patent No.: US 10,150,264 B2
(45) Date of Patent: Dec. 11, 2018

(54) HYBRID POLYMER CONTAINER

(71) Applicant: Ron Elkana, Hopkins, MO (US)

(72) Inventor: Ron Elkana, Hopkins, MO (US)

( * ) Notice: Subject to any disclaimer, the term of this patent is extended or adjusted under 35 U.S.C. 154(b) by 0 days.

(21) Appl. No.: 15/794,958

(22) Filed: Oct. 26, 2017

(65) Prior Publication Data
US 2018/0229450 A1   Aug. 16, 2018

Related U.S. Application Data

(60) Provisional application No. 62/414,386, filed on Oct. 28, 2016.

(51) Int. Cl.
| | | |
|---|---|---|
| *B29C 65/70* | (2006.01) | |
| *B29C 70/34* | (2006.01) | |
| *B65D 90/02* | (2006.01) | |
| *B29C 53/62* | (2006.01) | |
| *B29L 31/00* | (2006.01) | |

(52) U.S. Cl.
CPC ............ *B29C 70/347* (2013.01); *B29C 53/62* (2013.01); *B29C 65/70* (2013.01); *B65D 90/022* (2013.01); *B65D 90/029* (2013.01); *B29L 2031/7172* (2013.01)

(58) Field of Classification Search
CPC ......... B29C 53/62; B29C 53/64; B29C 53/66; B29C 53/581; B29C 47/005; B29C 47/0052; B29C 70/224; B65D 90/022; B65D 90/029

USPC .......................... 156/167, 171, 173, 190, 195
See application file for complete search history.

(56) References Cited

U.S. PATENT DOCUMENTS

| | | | | |
|---|---|---|---|---|
| 3,625,389 | A * | 12/1971 | Bartlow | B65D 90/029 220/367.1 |
| 4,319,944 | A * | 3/1982 | Pope | B29C 53/566 156/195 |
| 6,102,241 | A * | 8/2000 | Palazzo | B29C 47/0019 220/586 |
| 2005/0260373 | A1* | 11/2005 | DeLay | B29C 53/602 428/36.4 |

\* cited by examiner

*Primary Examiner* — Scott W Dodds
(74) *Attorney, Agent, or Firm* — Buskop Law Group, P.C.; Wendy Buskop

(57) ABSTRACT

The method for forming from a round shaped cylinder to a square shaped cylinder which can be inserted in a square or rectangular shape metal container (shipping container and frac tanks) includes initiating turning of a heated mandrel, extruding heated polymer, wrapping while compressing a first layer of heated polymer, disposing a mesh layer over the cylinder encapsulating the cylinder on the turning mandrel while simultaneously laying a second layer of heated polymer over the turning mandrel and compressing the layer of heated polymer into the mesh layer and the mesh layer into the first layer of heated polymer simultaneously, and repeating the layering of the heated polymer and mesh layer until a desired wall is reached. The method forms a hybrid polymer square or oval tank or a hybrid polymer round, which achieves over 95 percent of the total volume of the metal container.

13 Claims, 14 Drawing Sheets

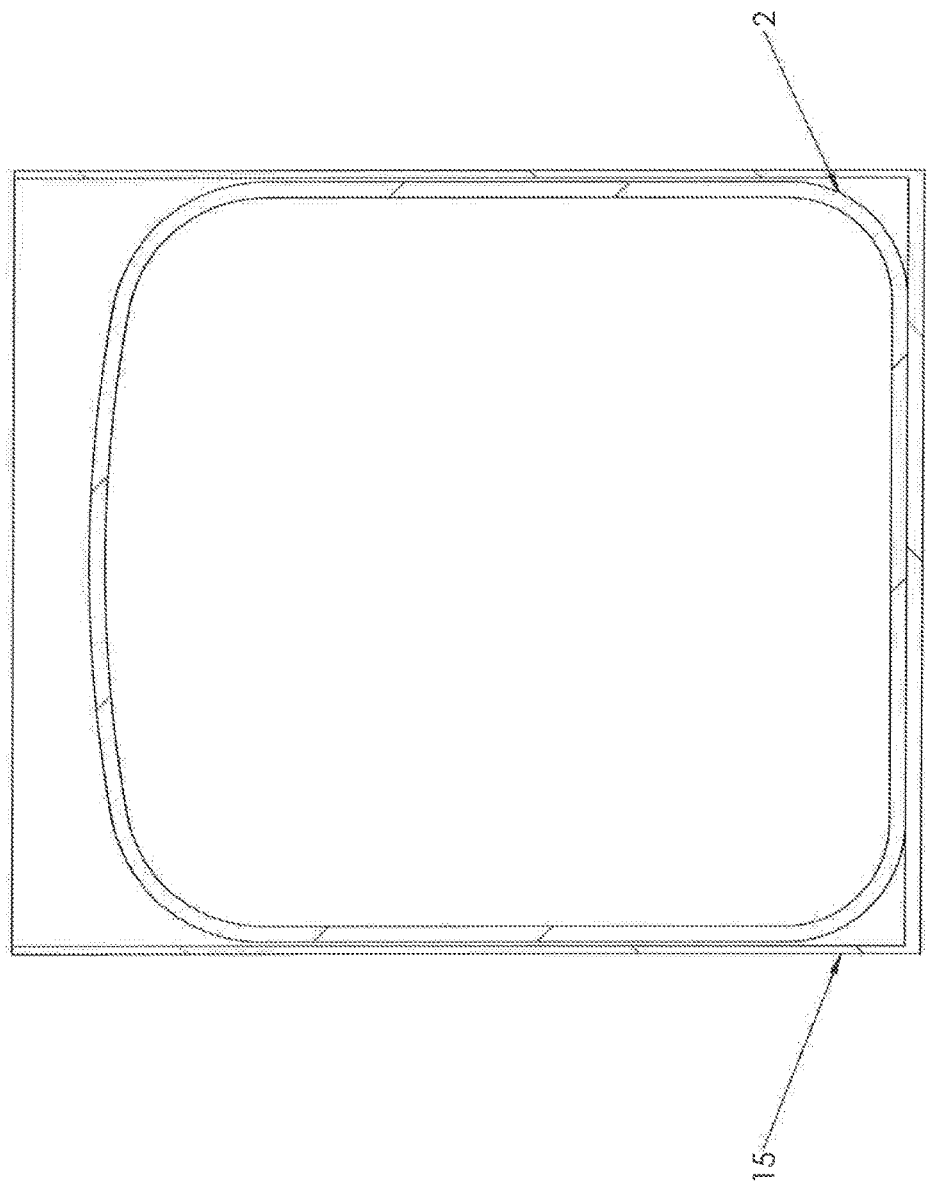

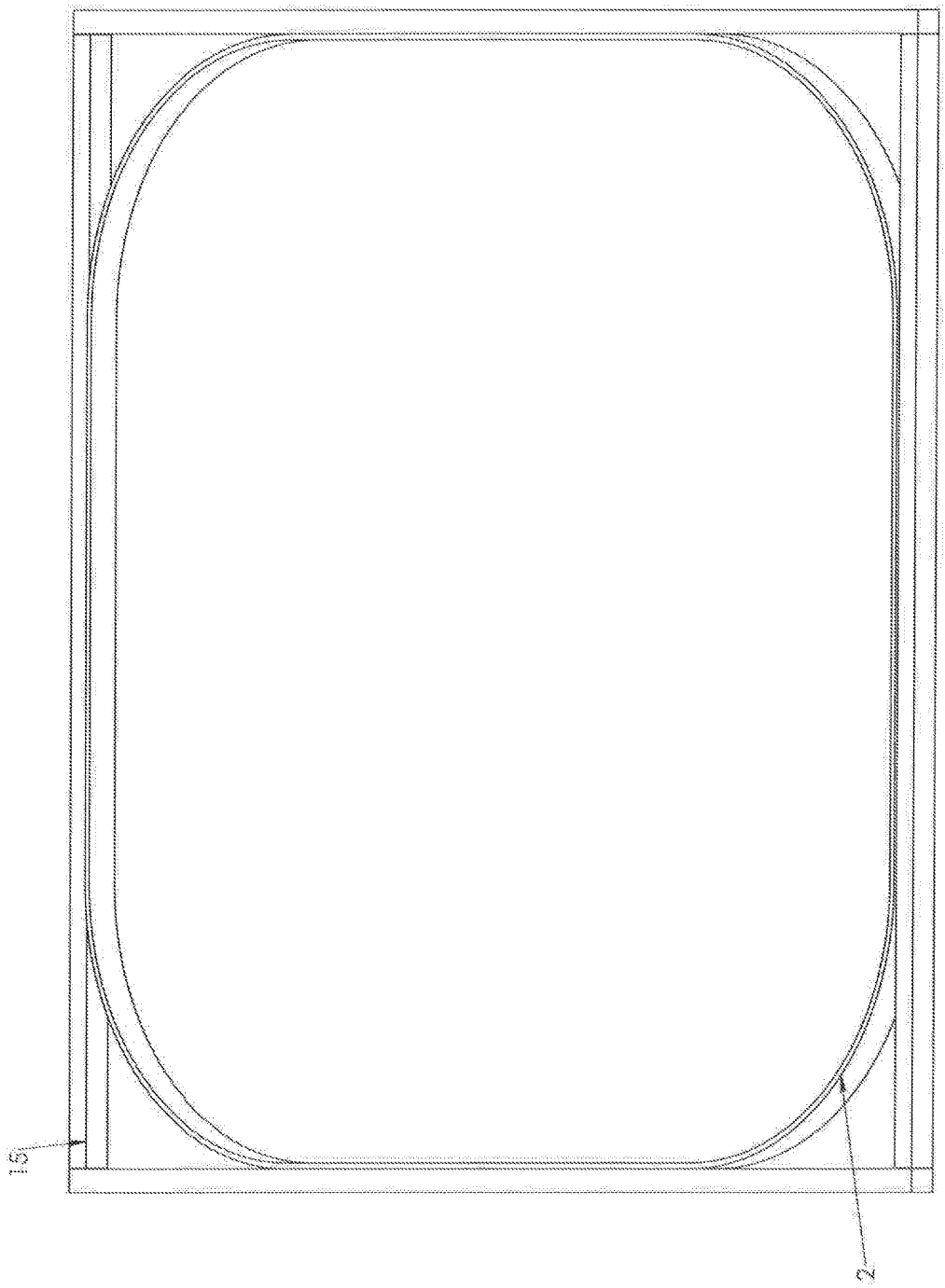

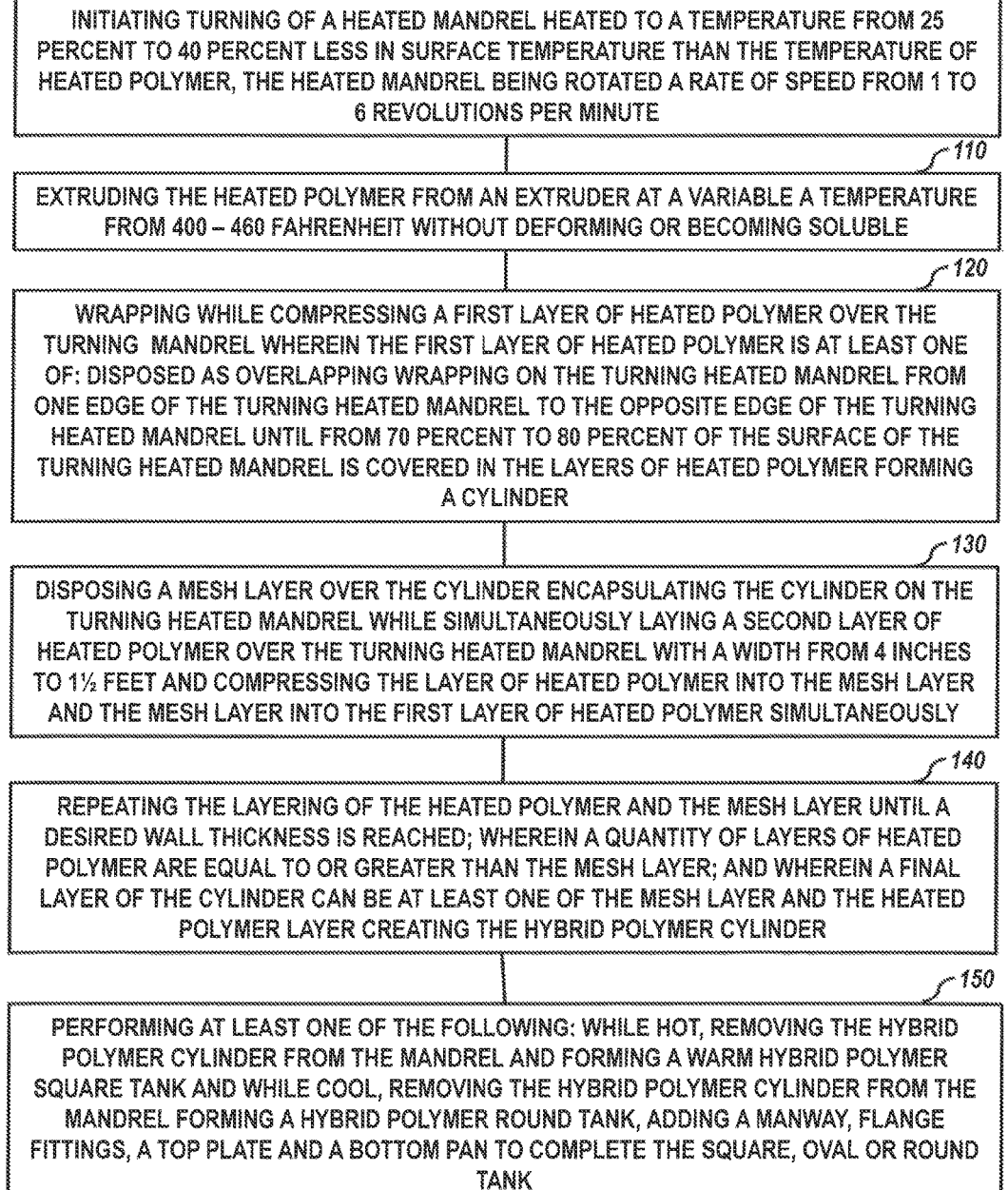

FIG. 15A

100 — INITIATING TURNING OF A HEATED MANDREL HEATED TO A TEMPERATURE FROM 25 PERCENT TO 40 PERCENT LESS IN SURFACE TEMPERATURE THAN THE TEMPERATURE OF HEATED POLYMER, THE HEATED MANDREL BEING ROTATED A RATE OF SPEED FROM 1 TO 6 REVOLUTIONS PER MINUTE

110 — EXTRUDING THE HEATED POLYMER FROM AN EXTRUDER AT A VARIABLE A TEMPERATURE FROM 400 – 460 FAHRENHEIT WITHOUT DEFORMING OR BECOMING SOLUBLE

120 — WRAPPING WHILE COMPRESSING A FIRST LAYER OF HEATED POLYMER OVER THE TURNING MANDREL WHEREIN THE FIRST LAYER OF HEATED POLYMER IS AT LEAST ONE OF: DISPOSED AS OVERLAPPING WRAPPING ON THE TURNING HEATED MANDREL FROM ONE EDGE OF THE TURNING HEATED MANDREL TO THE OPPOSITE EDGE OF THE TURNING HEATED MANDREL UNTIL FROM 70 PERCENT TO 80 PERCENT OF THE SURFACE OF THE TURNING HEATED MANDREL IS COVERED IN THE LAYERS OF HEATED POLYMER FORMING A CYLINDER

130 — DISPOSING A MESH LAYER OVER THE CYLINDER ENCAPSULATING THE CYLINDER ON THE TURNING HEATED MANDREL WHILE SIMULTANEOUSLY LAYING A SECOND LAYER OF HEATED POLYMER OVER THE TURNING HEATED MANDREL WITH A WIDTH FROM 4 INCHES TO 1½ FEET AND COMPRESSING THE LAYER OF HEATED POLYMER INTO THE MESH LAYER AND THE MESH LAYER INTO THE FIRST LAYER OF HEATED POLYMER SIMULTANEOUSLY

140 — REPEATING THE LAYERING OF THE HEATED POLYMER AND THE MESH LAYER UNTIL A DESIRED WALL THICKNESS IS REACHED; WHEREIN A QUANTITY OF LAYERS OF HEATED POLYMER ARE EQUAL TO OR GREATER THAN THE MESH LAYER; AND WHEREIN A FINAL LAYER OF THE CYLINDER CAN BE AT LEAST ONE OF THE MESH LAYER AND THE HEATED POLYMER LAYER CREATING THE HYBRID POLYMER CYLINDER

150 — PERFORMING AT LEAST ONE OF THE FOLLOWING: WHILE HOT, REMOVING THE HYBRID POLYMER CYLINDER FROM THE MANDREL AND FORMING A WARM HYBRID POLYMER SQUARE TANK AND WHILE COOL, REMOVING THE HYBRID POLYMER CYLINDER FROM THE MANDREL FORMING A HYBRID POLYMER ROUND TANK, ADDING A MANWAY, FLANGE FITTINGS, A TOP PLATE AND A BOTTOM PAN TO COMPLETE THE SQUARE, OVAL OR ROUND TANK

HYBRID POLYMER CONTAINER

CROSS-REFERENCE TO RELATED APPLICATION

The present application claims priority to and the benefit of co-pending U.S. Provisional Patent Application Ser. No. 62/414,386 filed on Oct. 28, 2016, entitled "HYBRID POLYMER CONTAINER". This reference is hereby incorporated in its entirety.

FIELD

The present embodiment generally relates to accelerated method for making a reduced plastic content hybrid polymer tank for industrial processes and storage of liquid and solids, more particularly to a container with rotomolded components or flat sheet joined to an extruded cylinder.

The extruded plastic layers can be reinforced with the mesh in between the layers.

Cylindrical tanks can be converted to oval or rectangular tanks inserted into a metal shipping container or frac tanks and supported by the metal structure of the container.

BACKGROUND

A need exists for a rotomolded tank has with tolerance for apertures.

A further need exists for a rotomolded tanks that does not crack when such apertures are made or inserted into such tanks.

The present embodiments meet these needs.

The present invention relates generally to containers such as tanks for industrial processes and storage of liquids and solids, more particularly to a container with rotomolded components or flat sheet joined to an extruded cylinder.

After the oil strike in Titusville, Pa., the petrochemical and water industries have sought containers and tanks to store various fluids, slurries, gases, pellets, and solids. Such tanks have used reinforced concrete and steel observed at refineries, chemical plants, water treatment plants, factories, sewer plants, shipyards, terminals, and the like. Where industry has to store a component or ingredients, tanks appear and stand duty.

Industry has made tanks by winding layers of material for a few decades in many countries. Polymer tanks come in many sizes for various applications. The tanks begin as an extruder emits a strip of heated polymer onto a rotating mold. The extruder emits the strip under a roller gang that presses the polymer upon the mold. Following the first revolution of the mold, the extruder overlaps a new strip upon the adjacent previous strip as the extruder moves axially parallel to the mold. The extruder, roller gang, and mold cooperate to fuse the layers of polymer into a cylinder such as a tank.

Select tanks have had reinforcement with polymers like polyethylene, polypropylene, polyester, vinyl ester, epoxies of glass, carbon fiber, Kevlar®, and the like. The reinforcement enters the tank assembly as another component blended into molten polymer. However, select components alter the performance of the polymer and discourage mixing of them.

During extrusion of a tank, the strip has a width from a few inches to a foot and a thickness of ¼ to ½ inch. The strip wraps upon a rotating drum whose rotation slow ejects a nascent cylinder following compression by the roller gang. The roller gang compresses the polymer strip so that adjacent wrapped strips fuse totally and avoid any accumulation of air between adjacent strips. The strip has approximately ½ inch to half of strip width of overlap between adjacent wraps as the extruder moves horizontally and ejects a nascent cylinder. This wrapping of strip to form a cylinder appears similar to the medical practice of wrapping a bandage, or cast material, upon a human arm. Repeating the wrapping of the strip back and forth horizontally with the extruder then increases the wall thickness of a resulting polymer cylinder for a tank, a pipe, or when slit, a flat sheet.

DESCRIPTION OF THE PRIOR ART

Industry and transportation have made tanks and containers for many years. Early tanks had forms descended from barrel making where abutting panels were joined in impermeable joints. Tanks have had new forms specifically made for them that meet select applications: egg shape digesters, floating top storage tanks, rail tank cars, trailer tank cars, truck tankers, and the like.

The publication to Hsi-Wu, No. 2005/0001100 shows reinforced foam upon a fuel tank. The fuel tank has a skin with an exterior surface that receives a foam layer. The foam layer has reinforcement placed in it. Hsi-Wu claims a composite or reinforced insulation layer affixed to a skin layer.

The patent to Stearns, U.S. Pat. No. 2,376,831 describes a high pressure vessel. The vessel has a thin walled, gas impervious, inner shell wrapped in a woven wire sheath, and caps encasing the reinforced shell. This patent shows wire woven into an apparent mesh pattern and placed between two steel walls. This patent discloses a method of weaving a mesh but does not show the mesh as an integral part of a tank wall.

The patent to Broerman, U.S. Pat. No. 3,426,940 illustrates pressure vessels formed within molds. FIGS. 2, 3 show insertion of a sock, column 3 line 45, also shown as c. 3 l. 45, into a chamber and then inflation of polymer against that sock. The sock then embeds and fuses between two parisons 6, 12 producing a reinforced wall. The patent has an example VI that describes a rotating pipe mold at a speed to throw cloth outwardly.

The patent to Goldsworthy, U.S. Pat. No. 3,692,601 provides a method for making a storage tank of fiberglass. This method first forms the end domes for the tank then places the end domes into a tank mold. The fiberglass resin and filaments are placed upon the interior of a cylindrical mold. The mold has three hinged sections and rotates.

The patent to Terlesky, U.S. Pat. No. 4,041,722 shows another cryogenic storage tank, for liquefied natural gas among other fluids. This tank has an inner metal tank within a reinforced concrete outer wall for protection from large impacts, c. 1 l. 7, 32. This patent refers to reinforced concrete in passing for the outer wall and has little if any discussion about reinforcing steel mesh whether as a grid, Q mat, fabric, rebar, or bar steel.

The patent to Palazzo, U.S. Pat. No. 6,022,435 has a method of making an underground storage tank, generally for petroleum fuels and products. The method produces a double walled tank with an inner tank 10, an outer sheath 56, and spacing means 62 between the inner tank and outer sheath shown in FIG. 1. The spacing means does permit flow of liquids between the inner tank and outer sheath, c. 2 l. 53-55, c. 7 l. 57-62. The spacing means includes a thermoplastic mesh 64, c. 7 l. 45-46. Alternatively, the spacing means includes protrusions 78, c. 9 l. 55-60. This patent does not describe bonding the mesh to both the inner tank and outer sheath.

The second Palazzo patent, U.S. Pat. No. 6,026,977 describes an underground storage tank for petroleum and made from a similar method as in the '435 patent. The spacing means does permit flow of liquids between the inner tank and outer sheath and mentions a thermoplastic mesh. This patent though puts more emphasis upon a resin layer and an adhesive located near a tank aperture.

The third Palazzo patent, U.S. Pat. No. 6,102,241 provides an underground petroleum storage tank. This patent describes making of a tank upon a mold 10 from helically wound strips 32 as in FIG. 1. The description continues with making a second tank outwardly of the first tank to make a double walled tank. The second tank has a release layer upon it 54 that spaces the second tank from the first tank similarly to the preceding patent. This patent mentions mesh in one place, as a release material. The release material once again spaces the inner tank, or first tank, from the outer sheath, or second tank, and allows passage of liquids between them.

The fourth Palazzo patent, U.S. Pat. No. 6,119,887 once more has an underground petroleum storage tank and a method to make it. This patent describes making of a tank upon a mold 10 from helically wound strips 32 as in FIG. 1. This patent mentions mesh 34 in one place, as a release material. The release material once again spaces the inner tank from the outer sheath so liquids may pass between them. Your invention merges the mesh into the polymer layers and leaves no spacing or gap.

The fifth Palazzo patent. U.S. Pat. No. 6,138,861, shows a double walled underground petroleum storage tank and a method to make it. This patent describes adding helically wound strips 56 upon a steel tank 10 as in FIG. 1. This description begins with the steel tank and then the resins as in the previous four patents. This patent mentions mesh 64 as a release material that spaces the inner tank from the outer sheath so liquids pass between them.

Turning to the Keehan patent, U.S. Pat. No. 6,167,827 illustrates a maritime chemical tanker vessel. The vessel has many tanks within its hull and they have four layer construction using resins. A mesh has an inorganic top coat and placement in the fourth outer layer for fire protection of the tank. The patent describes the mesh as steel for heat dissipation.

Keehan has a second patent, U.S. Pat. No. 6,267,069, that provides a six layer tank for a maritime chemical tanker vessel. This patent shows a tank of six layers. The fifth and sixth layers have locations relative to the second and third layers respectively. Once more, the mesh has an inorganic top coat and placement in the fourth outer layer for fire protection of the tank. The mesh of steel dissipates heat dissipation.

And, the publication to Roy, No. 2002/0088805 describes a double walled storage tank. Roy has the tank as an inner tank wrapped in an impervious film and then covered with reinforced resinous material. The description shares much with the Palazzo patents above and their crinkled spacing means. Roy describes the reinforced resinous material as fiberglass and then mentions mesh, para. 0023, as a spacer means for the endwalls of the tank. Roy omits discussion of the mesh embedding into the tank or any polymer.

The present invention seeks to overcome the disadvantages of the prior art and provide additional advantages not heretofore shown. While the present invention serves many purposes, it accommodates the restrictions of each.

The present invention has a container of rotomolded components joined to an extruded cylinder. This combination of components maximizes the strengths of each and minimizes the weaknesses in rotomolded and extruded components. The invention also reinforces a polymer tank wall adding mesh in between the layers of the extruded cylinder.

BRIEF DESCRIPTION OF THE DRAWINGS

The detailed description will be better understood in conjunction with the accompanying drawings as follows:

FIG. 13A depicts a view of a wrap reinforced according to one or more embodiments.

FIG. 13B depicts a cross section view of a rectangular cylinder tank into a rectangular cross section of a metal container/frac tank.

FIG. 15A-15C depicts the method according to one or more embodiments.

Figure 1:
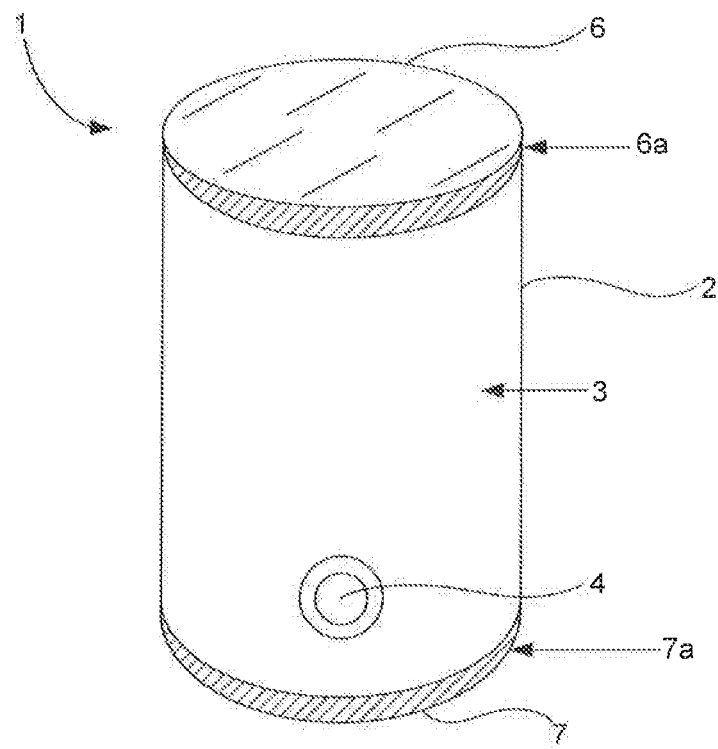
FIG. 1 depicts a front perspective view of the tank according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present invention relates to the accelerated method for making a reduced plastic content hybrid polymer tank.

The method for making a reduced plastic content hybrid polymer tank can include initiating turning of a heated mandrel heated to a temperature from 25 percent to 40 percent less in surface temperature than the temperature of heated polymer, the heated mandrel being rotated a rate of speed between 1 and 6 revolutions per minute.

The method can include extruding the heated polymer from an extruder at a variable a temperature from 400-460 Fahrenheit without deforming or becoming soluble.

The method can include wrapping while compressing a first layer of heated polymer over the turning mandrel wherein the first layer of heated polymer is at least one of: disposed as overlapping wrapping on the turning heated mandrel from one edge of the turning heated mandrel to the opposite edge of the turning heated mandrel until from 70 percent to 80 percent of the surface of the turning heated mandrel is covered in the layers of heated polymer forming a cylinder.

The method can include disposing a mesh layer over the cylinder encapsulating the cylinder on the turning heated mandrel while simultaneously laying a second layer of heated polymer over the turning heated mandrel with a width from 4 inches to 1½ feet and compressing the layer of heated polymer into the mesh layer and the mesh layer into the first layer of heated polymer simultaneously.

The method can include repeating the layering of the heated polymer and the mesh layer until a desired wall thickness is reached; wherein a quantity of layers of heated polymer are equal to or greater than the mesh layer; and wherein a final layer of the cylinder can be at least one of the mesh layer and the heated polymer layer creating the hybrid polymer cylinder.

The method can include performing at least one of the following: while hot, removing the cylinder from the mandrel and forming a warm hybrid polymer square tank; and while cool, removing the hybrid polymer cylinder from the mandrel forming a hybrid polymer round tank, adding a manway, flange fittings, a top plate and a bottom pan to complete the square, oval or round tank.

The method of transforming from a round shaped cylinder to a square shaped cylinder by putting the round shaped cylinder in a rectangular jig while hot and compressing it with the top of the jig to achieve the desired height of the square/rectangular cylinder, which can be inserted in a square or rectangular shape metal container to achieve over 95 percent of the total volume of the metal container.

The method can include cooling the warm hybrid polymer square tank and welding a top plate and a bottom pan of a polymer similar to the material used to make the tank to an outside surface of the tank enclosing the tank and supporting the top plate and the bottom pan with at least one rib providing pressure control to the interior of the square tank.

In an embodiment, the invention can involve a process where a reinforcing layer is placed between at least two layers of polymer. The reinforcing layer includes continuous wire filament in an orthogonal or an irregular arrangement and a grid like mesh.

This embodiment reinforces polymers, such as high density polyethylene, low density polyethylene, and polypropylene, in a spiral wound extrusion process. This embodiment may see use in other processes of manufacturing such as injection molding, compression molding, vacuum molding, and the like. The reinforcing or mesh layer extends between layers of heated polymer as the extruder moves along, continually wrapping the polymer and mesh upon the mold.

A roller gang presses a later layer of polymer upon the mesh and fuses it to a prior layer. The mesh generally extends for the length of the desired finished product. The mesh has a grid like form with filaments of a flat cross section, bonds and merges with the polymer, and provides additional strength against compressive loads.

In this embodiment, the mesh materials may have a coating of polyethylene, polypropylene, polyvinyl chloride, ultra high molecular weight polyethylene, polyvinylidene fluoride, Kynar®, or have no coating. In an alternate embodiment, the mesh is replaced with a glass rope, metallic wire, Kevlar®, or other continuous material.

In this embodiment, when the drum rotates with the spiral wound strip applied to it and the extruder moves slowly to the length of the desired cylinder, the extruder emits a strip of polymer, often seven inch wide by ½ inch thick. During the wrapping of a spiral strip, reinforcement material enters the strip automatically from a spool of glass rope, metallic wire, Kevlar®, or other continuous material.

The reinforcing material embeds between a first layer of polymer and a second adjacent layer. The width of the reinforcing material may measure larger or smaller than the strip of applied polymer. The reinforcing material may have a mesh structure and bonds one strip to an adjacent strip. The reinforcing material undergoes a fusion, chemical bond, or physical bond with the polymer under action of the roller gang.

The roller gang presses the molten polymer through the openings of the mesh of reinforcing material. This pressing of polymer into the mesh creates a full fusion between a first layer of polymer, reinforcing material, and a second layer of polymer. The innermost layer of a strip has solely polymer while layers outwardly merge reinforcement between every other layer.

The placement of reinforcement continues between a second and third layer of polymer strip, a third and fourth layer of polymer strip, and additional layers and the embodiment continues this process until the desired thickness appears for the finished product of tank, pipe, or flat sheet.

The embodiments have mesh reinforcement that increases the strength of the polymer cylinder, pipe, or flat sheet in compression resistance, shear resistance, elongation, and creep prevention. The reinforcement allows for reducing the thickness of the polymer in a finished product while maintaining the desired structural properties. The reinforcement can influence the expansion and contraction coefficient of the polymer. For example, adding a metal mesh will decrease the expansion and contraction of the polymer due to raising temperature environment.

The embodiments can allow for creation of cylinders for a tank and flat sheets made by cutting a warm plastic cylinder along its length, measure upon the drum. The cut former cylinder, warm and viscous, then is pulled off the drum and set upon a flat surface for cooling. A flat sheet then has dimensions of the length of its parent cylinder, a width of pi times the diameter of the parent cylinder, and the thickness of the parent cylinder's wall.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings.

Before explaining the current embodiment of the invention in detail, it is to be understood that the invention is not limited in its application to the details of construction and to the arrangements of the components set forth in the following description or illustrated in the drawings.

The embodiments are capable of other embodiments and of being practiced and carried out in various ways. Also, the phraseology and terminology employed herein are for the purpose of description and should not be regarded as limiting.

This invention allows industries such as manufacturers, chemical, oil and natural gas, mining, agriculture, water treatment, pharmaceuticals, steel industry, petroleum, municipalities, energy (including alternative energy), food and other industries to store any substance in the plastic rectangular or square container tank that is suitable to polyethylene or polypropylene. In the case of polypropylene, it will allow storing chemicals with elevated temperatures up to 200° F. (chemical dependent).

This process will allow an economic way to become a chemical storage tank. This use of the container tanks allows damaged frack tanks to become rejuvenated and used as a frack tank again.

This type of tank can be utilized efficiently in a case of an emergency of chemical spill.

Cylindrical containers typically tend to take a lot of space and specifically during delivery they can become an oversized dimensional load. This system allows high capacity of chemical storage in a container which is easy to use since most users and shippers know and have the equipment to handle them.

All plastic material used is environmentally friendly and can be used for regrind in the future.

The following terms are used herein:

The term "heated mandrel" can refer to a metal cylindrical mandrel that is built to sustain shrinkage of plastic. The mandrel is collapsible. The mandrel is wrapped with layers of heated polymer with a controlled width of 4 inches to 12 inches. Heated at from 130 to 170 degrees Celsius. The mandrel is a mold and is used repeatedly. The plastic (band) sheeting is taken from the mandrel by collapsing or reducing the diameter of the mandrel.

The term "heated polymer" can refer to feeding the extruder with room temperature plastics beads (raw material), the raw material can be either re-grind, virgin or a combination of virgin and re-grind material; the extruder heats the plastic and the output from a die is a plastic sheeting or plastic band. This plastic band is wrapped on the mandrel in a spherical manner.

The term "mesh layer" can refer to feeding a roll of metal mesh continuously through a roller to match the plastic sheeting or plastic band. The mesh layer and is wrapped around the mandrel with the plastic sheeting or band. The mesh layer is completely imbedded in the plastic sheeting or band.

The term "wall thickness" can refer to desired thickness of the layer of polymer after it has been wrapped around the mandrel.

The term "hybrid polymer tank" or "wonder tank" can refer to plastic layers after they have been fused to make the square, oval or round tank.

The term "roller gang" can refer to an apparatus to apply pressure to fuse one layer of sheeting or band to another.

Turning now to the figures, FIG. 1, the hybrid polymer container, or tank of the present invention appears as at 1.

FIG. 1 shows the container has a hollow cylinder 2 of extruded polymer. The cylinder 2 has a generally round shape with a wall 3 having a wall thickness. The extruded polymer construction of the cylinder 2 allows for introduction of openings such as a hatch 4 and others for various manufacturing and refining processes. Extruded lengthwise, the cylinder 2 has two spaced apart opposite open ends as at 5a and 5b later shown in FIG. 5.

Here, the open ends have a closed form shown to retain components stored in the tank. The embodiments have a rotomolded top plate 6 upon one end of the cylinder 2, here shown opposite the hatch 4 and a rotomolded bottom pan 7 opposite the top plate and beneath the hatch 4.

The top plate has a generally round shape and spans the diameter of the cylinder 2. The top plate has its own perimeter 6a that joins to the cylinder 2 in an impermeable connection. The bottom pan also has a round shape that spans the diameter of the cylinder 2 and closes the other end of the cylinder 2.

The bottom pan has a perimeter 7a joining as an impermeable connection to the cylinder. In embodiments, the construction of the top plate and the bottom pan as rotomolded which differs from the rigid extruded cylinder 2. More particularly, the top plate can resist up to a 100 ton dead load, such as from a crane, the bottom pan can resist up to a 125 ton dead load, such as from the components stored within the hybrid polymer container or tank 1.

The cylinder 2 has a reinforced construction that uses a mesh layer emplaced during the construction of the cylinder 2 during normal manufacturing processes. The mesh layer does not use or create an exothermic reaction. The cylinder may also have various heights to meet end applications of industry. Higher heights call for a cylinder of multiple sections joined together.

The cylinder's construction also permits no bulging or bowing of the wall 3 when components are stored therein. The cylinder, the top plate, and the bottom pan join using extrusion welding methods both upon the interior and the exterior of the cylinder.

Figure 2:
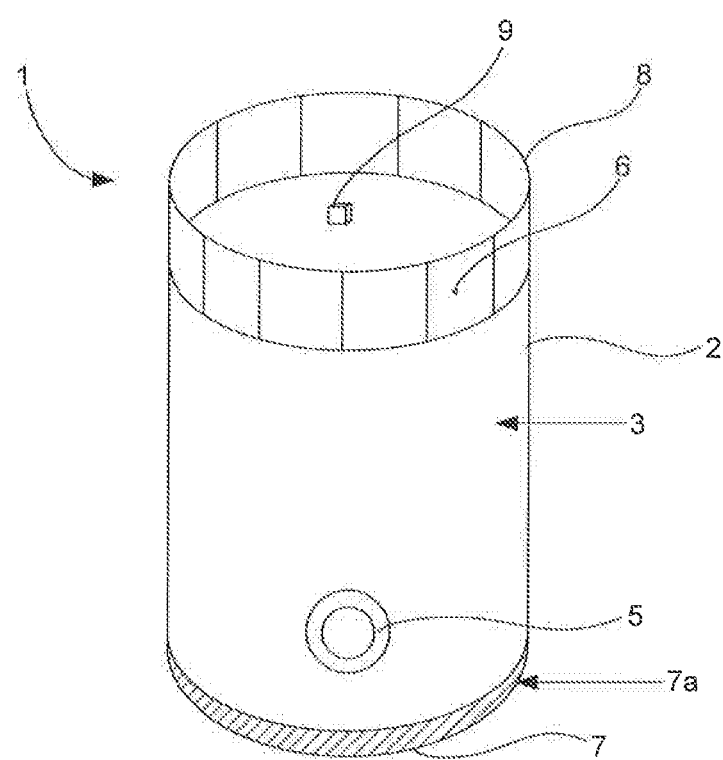
FIG. 2 depicts the prior art.

FIG. 2 shows depicts the prior are where the top plate 6 has a position within the cylinder 2 closer to the bottom pan 7.

In this form, the top plate has a slightly narrower diameter than in FIG. 1 so that the top plate 6 fits within the wall 3 of the cylinder 2. The top plate 6 slides into the cylinder 2 during assembly of the invention and then joins to the wall 3 of the cylinder 2 upon the interior. The downward position of the top plate 7 permits the wall 3 of the cylinder 2 to become a railing 8.

The railing may have a solid form where the wall continues as normally extruded or it may have an open form as shown where the wall has interruptions in its extrusion or substitution with fencing. Within the railing, the top plate may also have various accessories placed upon it, or even rotomolded into it. Such accessories include boxes 9, cabinets, pipes, piping, supports, chairs, hatches, ladders, and the like.

Figure 3:
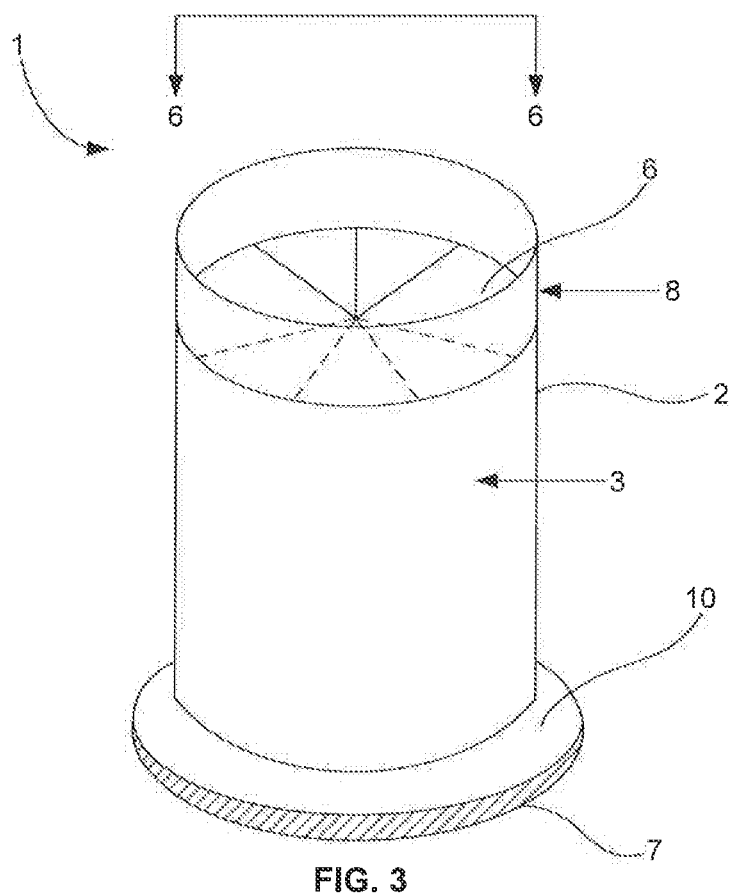
FIG. 3 depicts a front perspective view of the tank according to one or more embodiments.

FIG. 3 shows an alternate embodiment of the top plate 6 having a cone shape.

The top plate has a downward position as in FIG. 2 with the center of top plate 6, that is, the tip of the cone, aligned with the center of the cylinder 2. The top plate 6 has its position that provides a railing 8 or a portion of the wall 3 of the cylinder 2.

The cone shaped top plate operates as a roof for exterior tanks and sheds water. Opposite the top plate, this embodiment has the bottom pan 7 however, the bottom pan has its perimeter lengthened as the bottom has a larger diameter to form a skirt 10.

The skirt 10 appears as a portion of the bottom pan extending outwardly from the cylinder. The skirt 10 provides stability against lateral loads applied to the cylinder such as wind, seismic, vehicle, and the like as specified by select codes and engineering practices.

Figure 4:
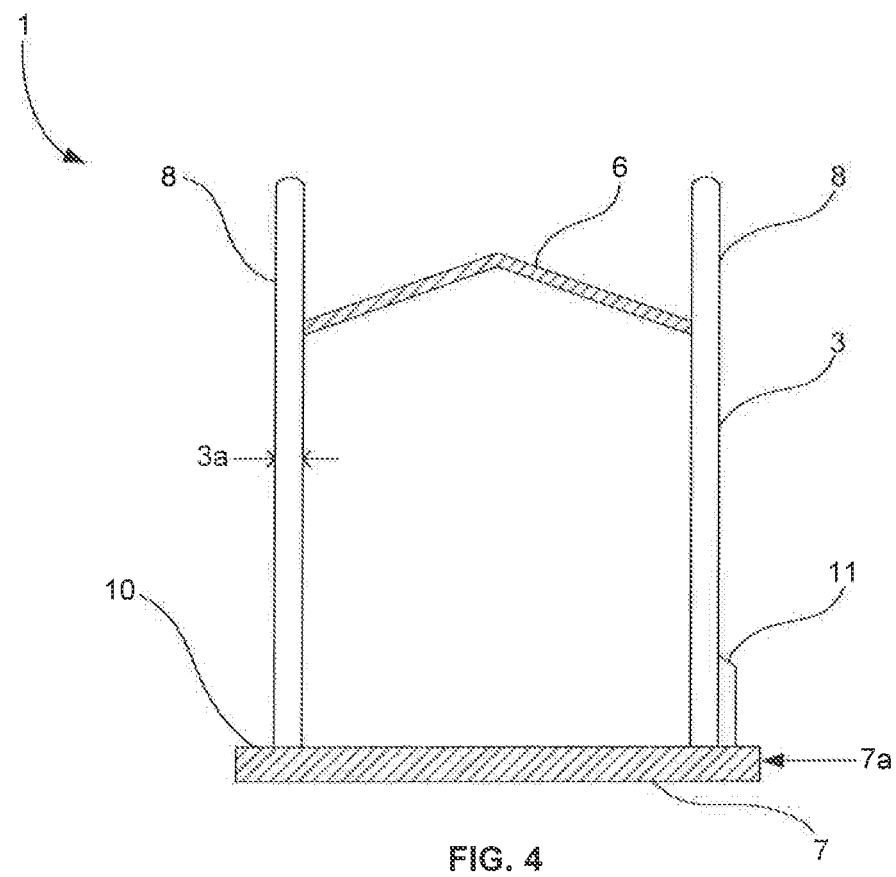
FIG. 4 depicts a sectional view of tank according to one or more embodiments.

FIG. 4 shows a sectional view through a tank having a cone shaped top plate 6.

The top plate fits within the wall 3 with a wall thickness 3a of the cylinder 2 and joins to the wall 3 in an impermeable connection. The cone shape produces an upward intersection of two surfaces as shown. This shape allows precipitation, water, steam, condensed vapors, and various objects, to land upon the top plate and then descend under gravity towards the wall.

Where the top plate joins to the wall, this embodiment may include a drainage system such as weep holes, open channels, piping, and the like to convey fluids and select solids from the invention. The wall 3 descends from the top plate 6 towards the bottom pan 7 here shown with the skirt 10 outwardly from the wall.

The skirt extends outwardly a multiple of the thickness of the bottom pan as desired for load distribution and prevention of tipping of the tank 1 during later loading. In select applications, the wall may have a buttress 11 welded upon it.

The buttress extends upwardly for a portion of the height of the cylinder 2 from the bottom pan 7 and adjoins the wall 3 of the cylinder. The buttress joins 11 to both the bottom pan 7 and the wall 3 by welding. The buttress 11 thickens the wall at its connection to the bottom pan for resisting kickout and other loads that accumulate in the lower portion of the invention 1 during its usage.

Figure 5:
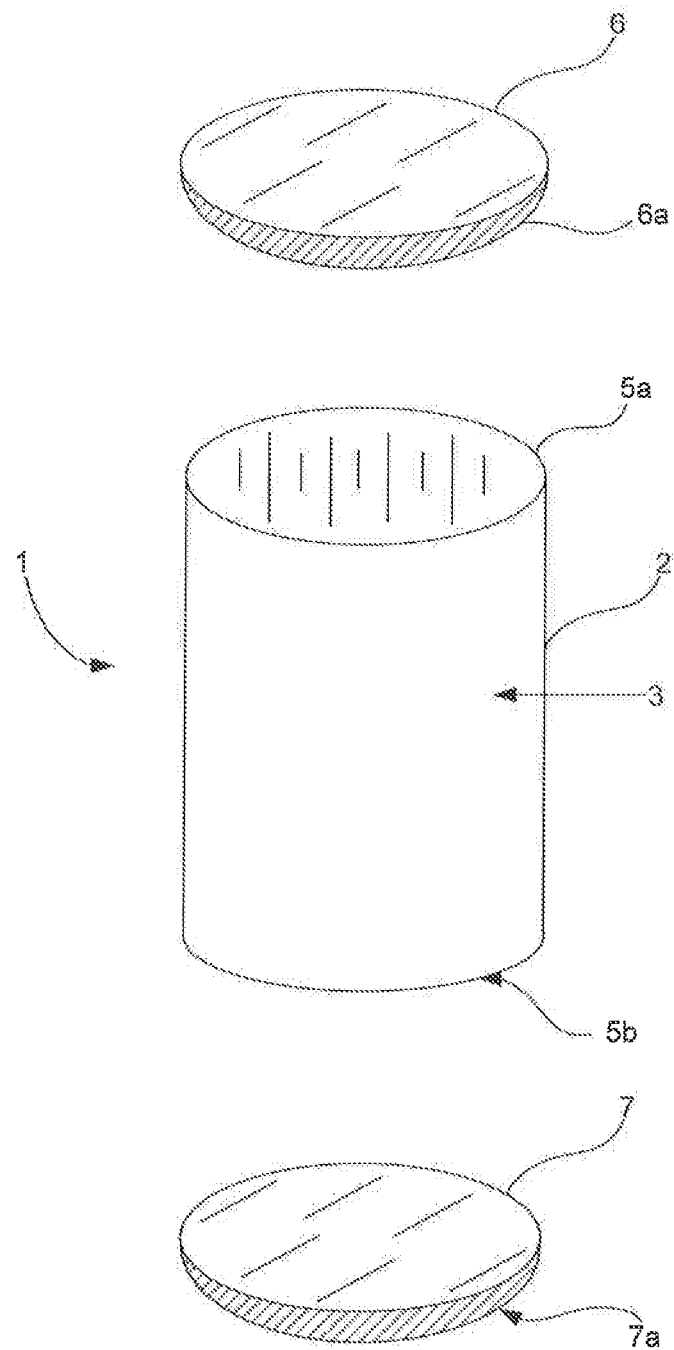
FIG. 5 depicts an exploded view of the tank according to one or more embodiments.

FIG. 5 depicts an exploded view of the tank 1 according to one or more embodiments.

The tank 1 has its cylinder 2 of extruded polymer with two open ends 5a and 5b. The hollow cylinder 2 has its wall 3 with a wall thickness. The wall thickness may vary but has a minimum of ¼ inch.

The cylinder 2 has preferably a round or square form with a diameter. The diameter also varies but has a maximum set by road width clearances for truck transport. The cylinder also has its height that varies but has a maximum set by trailer lengths for road transport, typically forty feet.

The cylinder though has an alternate embodiment made of sections so that a tank 1 may have a height greater than forty feet.

In this alternate embodiment, the sections join using polymer welding techniques as the installation site. As before, the cylinder and sections of cylinder have an extruded construction.

The top plate 6 has a generally round form of rotomolded construction with a perimeter 6a. The top plate has a diameter that fits upon the cylinder to close one open end 5a, here shown upwardly reflecting an upright installation of the embodiments. As previously shown and described, the top plate may have alternate embodiments of a cone shape, a lesser diameter shape for insertion within the cylinder, and the like. The top plate may also have various other components molded into it.

On the opposite open end 5b of the cylinder 2 from the top plate 6, the embodiments have the bottom pan 7. The bottom pan has a round form of rotomolded construction with its perimeter 7a. The bottom pan has a diameter that fits upon the cylinder to close the other end 5, here shown downwardly reflecting an upright installation of the invention. As previously shown and described, the bottom pan may have a skirt 10 form where the bottom pan has a diameter greater than the diameter of the cylinder.

Figure 6:
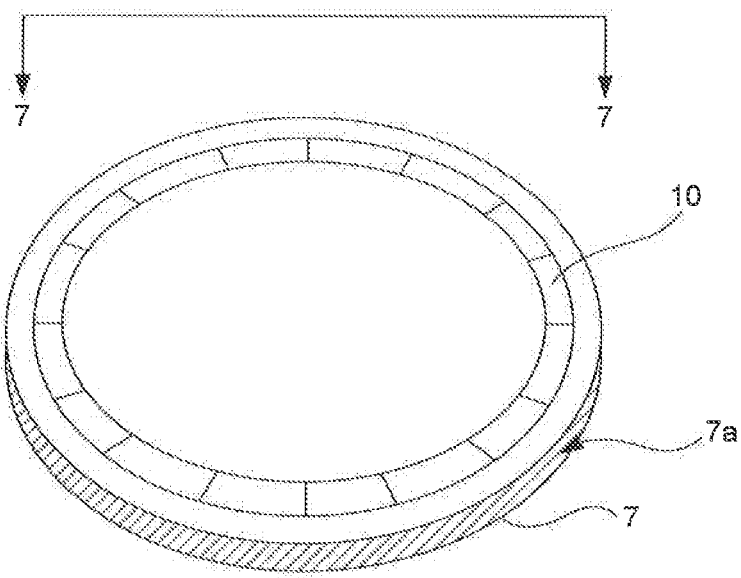
FIG. 6 depicts a bottom pan with skirt according to one or embodiments.
Figure 7:
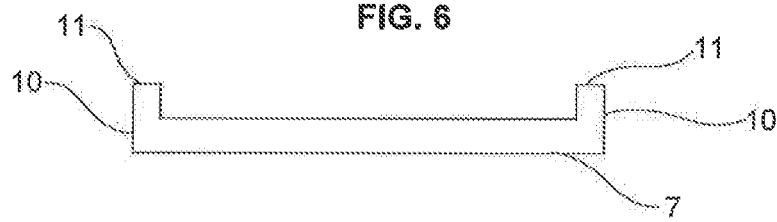
FIG. 7 depicts a sectional view of the bottom pan according to one or more embodiments.

FIG. 6 and FIG. 7 show the bottom pan 7 with its skirt.

The skirt extends slightly upwardly from the bottom pan so that it urges the wall 3 of the cylinder slightly outwardly for a snug fit upon the bottom pan as previously shown. The skirt 10 can extend slightly upwardly. The skirt can have a skirt wall 11, which is shown with a rectangular shape. However the skirt can be in other shapes such a circular.

This embodiment has the skirt wall extending upwardly similar to the thickness of the bottom pan. In this figure, the opposite skirt wall have a spacing to permit insertion of the cylinder 2 so its wall 3 contacts both skirt walls 10 in a snug fit for joining by welding.

Figure 8:
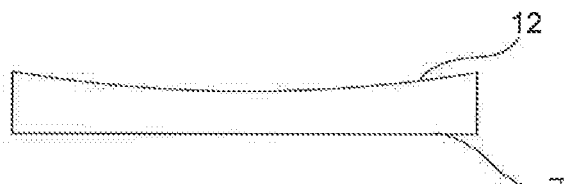
FIG. 8 shows a sectional view of the bottom pan with a dish shape according to one or more embodiments.

FIG. 8 shows a sectional view of another alternate embodiment of the bottom pan 7 having a dish shape 12. The dish shape appears as concave as required for various components stored within the invention 1 or processes performed therein.

Figure 9:
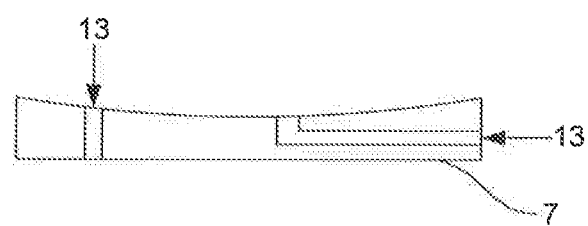
FIG. 9 shows a sectional view of the bottom pan with passageways according to one or more embodiments.

FIG. 9 then shows one more section view of the bottom pan 7 with passageways 13 molded into it.

Rotomolding of the bottom pan permits introduction of passageways in a variety of layouts, patterns, lengths, diameters, and positions. Typically, a passageway leads through the thickness of the bottom pan so components within the invention 1 may exit. This figure shows a dish shaped bottom pan of FIG. 8 having the passageways however, other shapes of the bottom pan may also have passageways.

Figure 10:
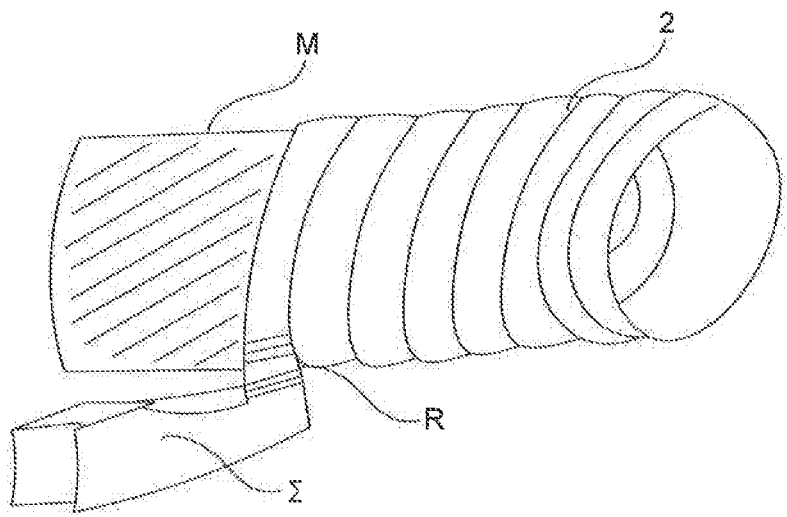
FIG. 10 depicts a perspective view of an alternate embodiment of polymer layers according to one or more embodiments.

FIG. 10 depicts reinforcing the construction of the cylinder 2 according to one or more embodiments.

The cylinder begins as a strip of molten polymer placed upon a mold or mandrel M having a drum shape. The drum slowly rotates and a carriage (not shown) beneath the cylinder slowly pulls it off the drum and the remainder of the mold or mandrel M. As described above, the strip of polymer wraps upon itself to make the wall 3 of the cylinder 2 at a desired thickness.

The wrapping of the polymer strip occurs through a roller gang R that nearly abuts the mold or mandrel M. The roller gang has its position at the end of an extruder E that emits the strip of polymer from precursor components supplied into the extruder.

In embodiments, the roller gang can apply from 90 psi to 140 psi onto the mesh layer or onto the polymer layer.

In operation, the drum rotates slowly as the extruder emits the polymer strip so the roller gang can overlap the polymer strip with each rotation of the drum.

The rotation rate of the drum, wraps to reach a desired wall thickness, and pull rate of the carriage have a coordinated action that produces a cylinder 2 of desired length, wall thickness, and diameter.

In embodiments, the polymer comprises polypropylene, polyethylene, including homopolymers and copolymers thereof, polyvinyl chloride, carbon polyvinyl chloride; polystyrene, and ultra high molecular weight polyethylene.

Figure 11:
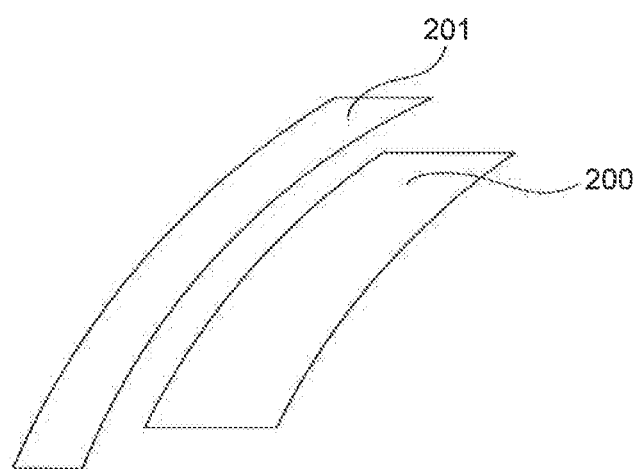
FIG. 11 depicts a detailed view of two layers according to one or more embodiments.

FIG. 11 shows the overlap of two adjacent strips of polymer, outwardly from the roller gang R.

The strips include a layer A 200 shown towards the right of the figure and a layer B 201 shown towards the left of the figure. The layer A 200 was placed upon the cylinder 2 ahead and before the layer B 201 by the roller gang. The roller gang then compresses layer B 201 upon layer A 200. The compression continues as the drum turns and the cylinder moves laterally to the right, as previously shown in FIG. 10.

Figure 12:
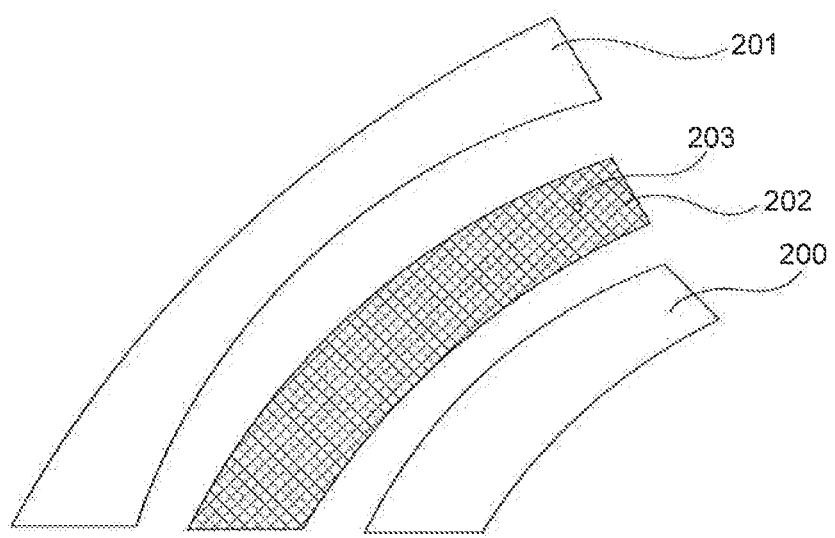
FIGS. 12-12A depicts a sectional view of two layers reinforced according to one or more embodiments.
Figure 12A:
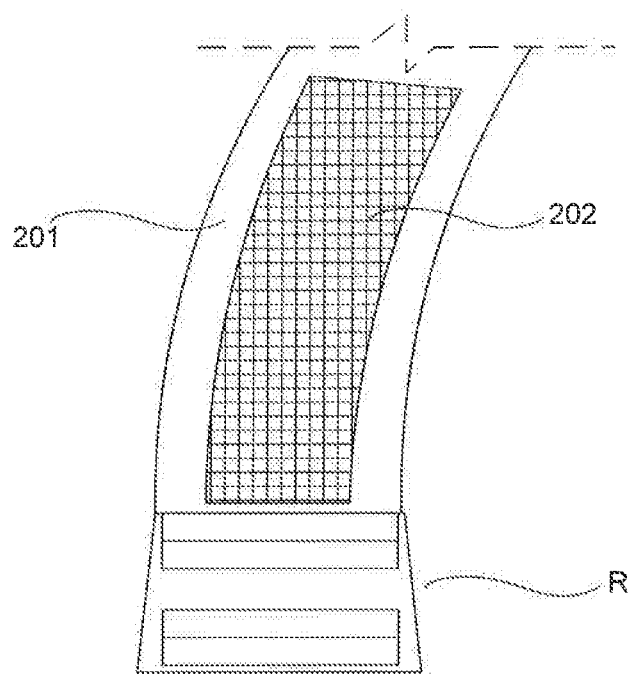

FIGS. 12-12A show an additional embodiment. The roller gang R previously applied layer A 200 upon the drum to commence making the cylinder. This embodiment then starts application of a mesh layer 202 upon layer A 200 and then beneath layer B 201.

The mesh layer has flexibility to follow the curvature of the layers 200, 201 of the polymer forming the cylinder. The mesh layer also has openings 203 of a minimum size to admit molten polymer into the mesh. The mesh also has a width similar to that of the polymer strips, here shown as layer A and layer B.

The roller gang R presses the layer B 201 upon the mesh layer 202 and into the layer A 200 of polymer in FIG. 12*a*. This figure shows layer B 201 as transparent to reveal the mesh layer molded into the wrap of layer A and layer B.

The mesh layer 202 emits from the roller gang R similar to the strip of molten polymer. The mesh layer 202 extends beneath layer B 201 and the roller gang then compresses both the layer B 201 and the mesh layer 202 into the preceding polymer layer A. The mesh layer than extends around and along the cylinder and through the wall thickness of the wall 3 of the cylinder 2.

The mesh layer may have various materials for its construction as described above. The mesh layer may also have various weaving patterns to optimize bonding with the polymer material and maximizing strength to weight ratio for the mesh, the polymer, and the cylinder. The mesh layer also extends at a rate from the roller gang to match the rotation rate of the drum, wraps to reach a desired wall thickness, and pull rate of the carriage have a coordinated action that produces a cylinder 2 of desired length, wall thickness, diameter, and strength.

In embodiments, the mesh layer can have a pore size from ¼ inch long to one inch long and from ¼ inch wide to one inch wide. For instance, the pore size can be ¼ inch×¼ inch, ½×½ inch, ⅜ inch×⅜ inch, or ¾ inch×¾ inch.

In embodiments, the mesh layer has a thickness from 0.4 mm to 2 mm and comprises at least one of: carbon steel, carbon steel coated with zinc, galvanized steel; Fiberglass™, carbon graphite fabric, nylon (Kevlar®)), cotton fabric; and stainless steel.

FIGS. 13A-13B depicts forming a square tank from a cylinder 2 using a rectangular jig 15.

While the cylinder is hot, the cylinder 2 is removed from the mold or mandrel by collapsing the metal, which decreases the diameter of the mandrel. The mandrel is pulled from the heated cylinder 2. Using a long spreader bar, the cylinder 2 is picked up and put into a rectangular jig 15 that is a bit smaller dimension than the cross section of the container we would like to fit our tank into.

Pressure is applied on top of the hot cylinder 2 forcing it to a rectangular shape of the rectangular jig 15. The cylinder hardens into a rectangular pipe shape that will fit our metal container.

Figure 14:
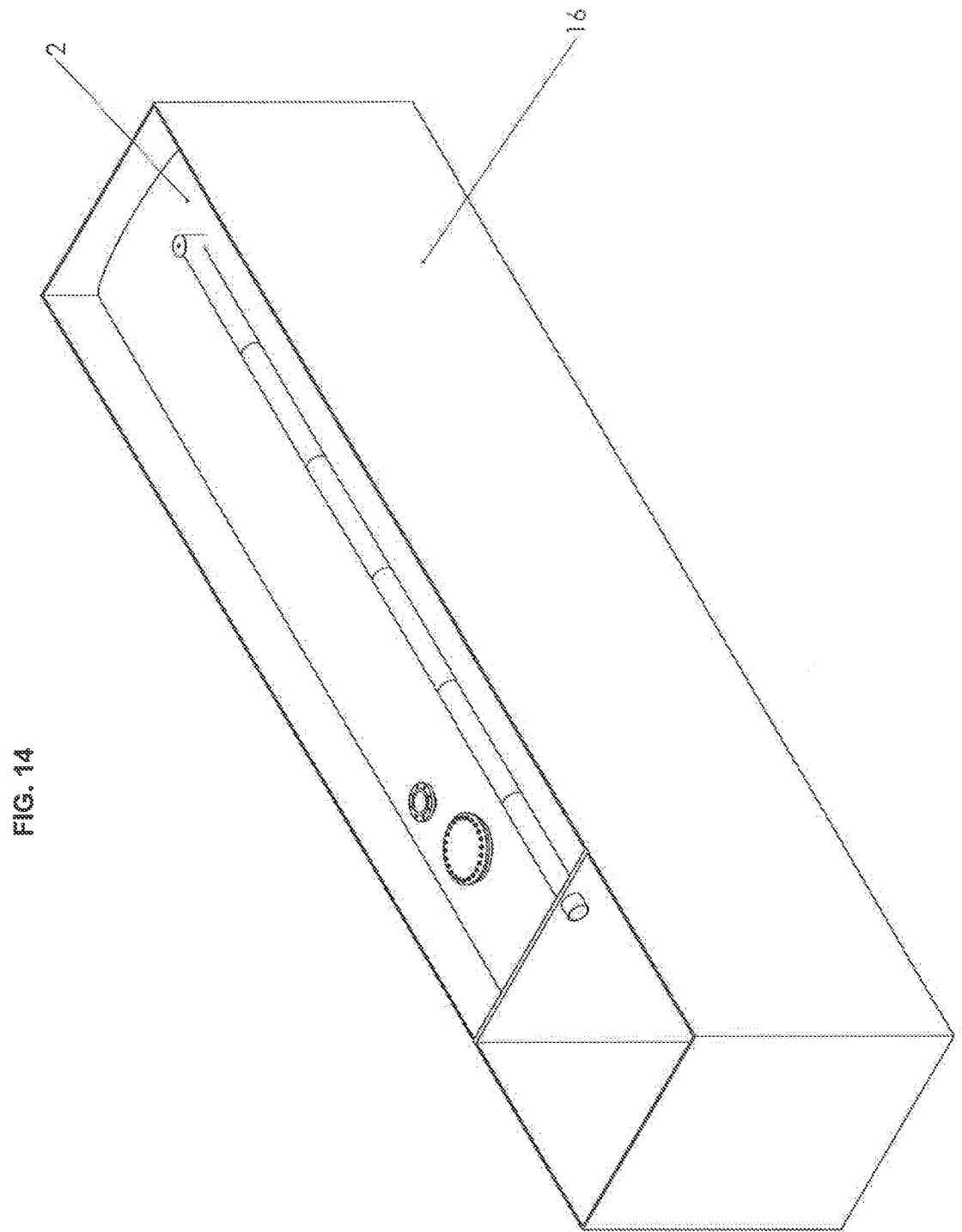
FIG. 14 depicts an oval cylindrical tank inserted into a rectangular metal container/frac tank.

FIG. 14 depicts the formed square tank 17 inside a metal container or tank 16.

Figure 15B:
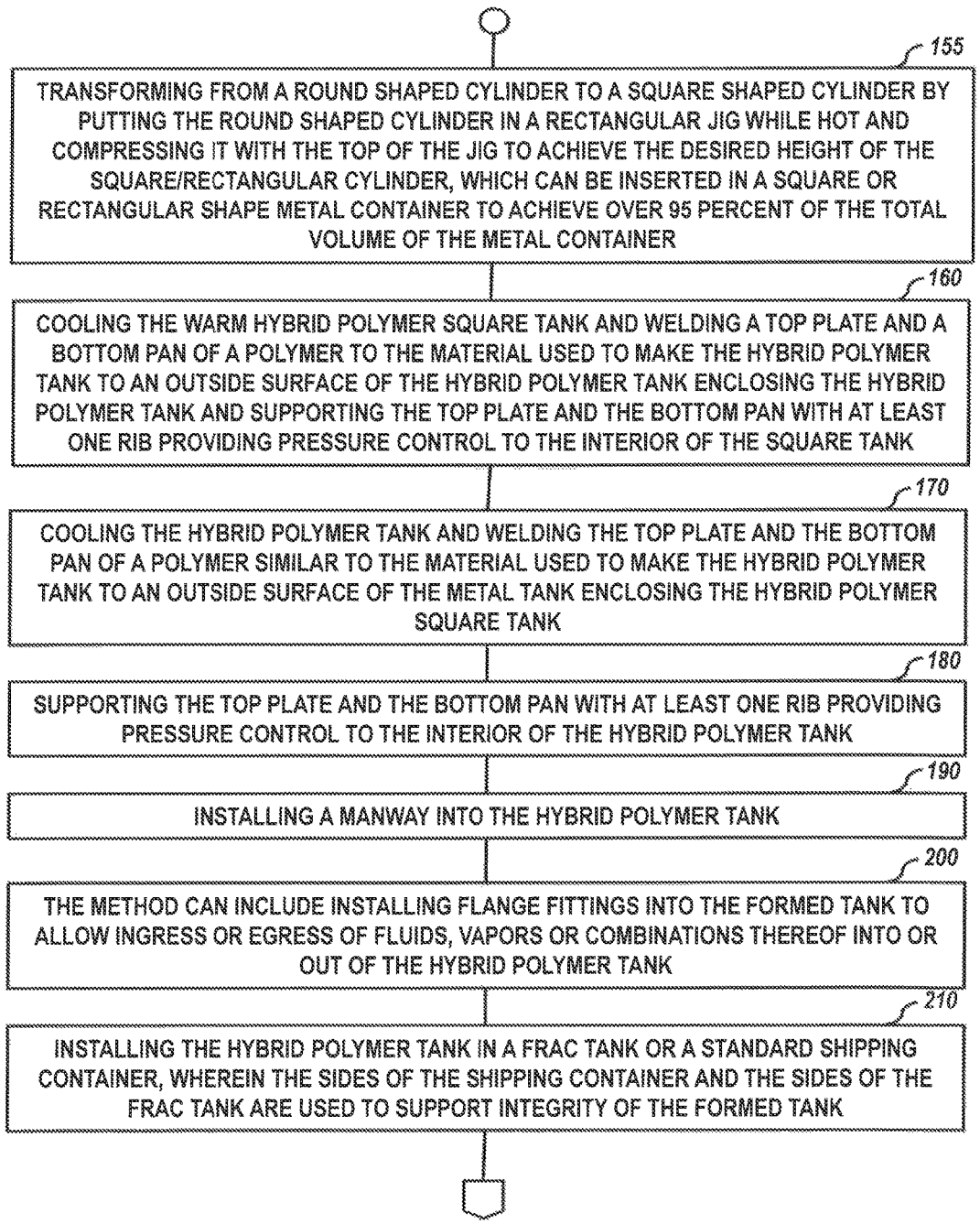
Figure 15C:
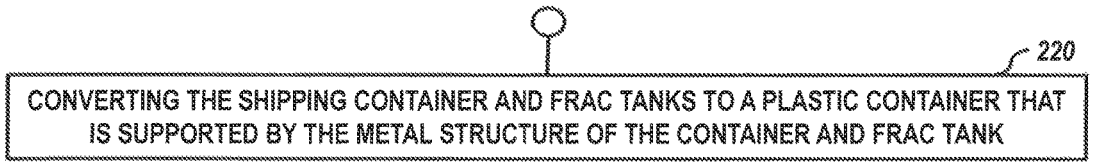

FIGS. 15A-15C depict the accelerated method for making a reduced plastic content hybrid polymer tank, which can include, but is not limited to the steps described below. The method can be utilized by a person of ordinary skill in the industry, and is not limited to a particular order or sequence.

In an embodiment, the method can include initiating turning of a heated mandrel heated to a temperature from 25 percent to 40 percent less in surface temperature than the temperature of heated polymer, the heated mandrel being rotated a rate of speed between 1 and 6 revolutions per minute, as shown in box 100.

For instance, a 4 foot diameter mandrel can be rotating 6 revolutions per minute, which is fast or a 12 foot diameter mandrel can be rotating at 1 revolution per minute, which is slow.

The method can include extruding the heated polymer from an extruder at a variable a temperature from 400-460 Fahrenheit without deforming or becoming soluble, as shown in box 110.

The method can include wrapping while compressing a first layer of heated polymer over the turning mandrel wherein the first layer of heated polymer is at least one of: disposed as overlapping wrapping on the turning heated mandrel from one edge of the turning heated mandrel to the opposite edge of the turning heated mandrel until from 70 percent to 80 percent of the surface of the turning heated mandrel is covered in the layers of heated polymer forming a cylinder, as shown in box 120.

The method can include disposing a mesh layer over the cylinder encapsulating the cylinder on the turning heated mandrel while simultaneously laying a second layer of heated polymer over the turning heated mandrel with a width from 4 inches to 1½ feet and compressing the layer of heated polymer into the mesh layer and the mesh layer into the first layer of heated polymer simultaneously, as shown in box 130.

In embodiments, the layers can have a thickness from 1¼ inch thickness to 1½ inch.

The method can include repeating the layering of the heated polymer and the mesh layer until a desired wall thickness is reached; wherein a quantity of layers of heated polymer are equal to or greater than the mesh layer; and wherein a final layer of the cylinder can be at least one of the mesh layer and the heated polymer layer creating the hybrid polymer cylinder, as shown in box 140.

The method can include performing at least one of the following: while hot, removing the hybrid polymer cylinder from the mandrel and forming a warm hybrid polymer square tank and while cool, removing the hybrid polymer cylinder from the mandrel forming a hybrid polymer round tank, adding a manway, flange fittings, a top plate and a bottom pan to complete the square, oval or round tank, as shown in box 150.

The method can include transforming from a round shaped cylinder to a square shaped cylinder by putting the round shaped cylinder in a rectangular jig while hot and compressing it with the top of the jig to achieve the desired height of the square/rectangular cylinder, which can be inserted in a square or rectangular shape metal container to achieve over 95 percent of the total volume of the metal container, as shown in box 155.

In embodiments, the square or rectangular shape metal container can be shipping containers and frac tanks.

The method can include cooling the warm hybrid polymer square tank and welding a top plate and a bottom pan of a polymer to the material used to make the hybrid polymer tank to an outside surface of the hybrid polymer tank enclosing the hybrid polymer tank and supporting the top plate and the bottom pan with at least one rib providing pressure control to the interior of the square tank, as shown in box 160.

The method can include cooling the hybrid polymer tank and welding the top plate and the bottom pan of a polymer similar to the material used to make the hybrid polymer tank to an outside surface of the metal tank enclosing the hybrid polymer square tank, as shown in box 170.

The method can include supporting the top plate and the bottom pan with at least one rib providing pressure control to the interior of the hybrid polymer tank, as shown in box 180.

The method can include installing a manway into the hybrid polymer tank, as shown in box 190.

The method can include installing flange fittings into the formed tank to allow ingress or egress of fluids, vapors or combinations thereof into or out of the hybrid polymer tank, as shown in box 200.

The method can include installing the hybrid polymer tank in a frac tank or a standard shipping container, wherein the sides of the shipping container and the sides of the frac tank are used to support integrity of the formed tank, as shown in box 210.

In embodiments, the frac tank or a standard shipping container can have a length of from 20 feet to 53 feet and a width of 8 feet The method can include converting the shipping container and frac tanks to a plastic container that is supported by the metal structure of the container and frac tank, as shown in box 220.

In embodiments, the round shaped cylinder and oval shaped cylinder and square shaped cylinder are seamless.

From the aforementioned description, a hybrid polymer container or tank has been described. The hybrid polymer tank is uniquely capable of joining a rotomolded top plate and a rotomolded bottom pan to an extruded cylinder.

Further, the hybrid polymer container may also have a mesh layer pressed into alternating layers of heated polymer during construction of a cylinder and other related features compatible with the structure and purpose of the invention as shown and described.

The hybrid polymer container and its various components may be manufactured from many materials, including but not limited to, vinyl, polymers, such as nylon, polypropylene, polyvinyl chloride, high density polyethylene, ferrous and non-ferrous metal foils, their alloys, and composites.

Below are examples of how the apparatus and method can be used.

EXAMPLE ONE

A reduced plastic content one piece integral wound tank is made by initiating a turning of a heated mandrel that is heated to a temperature of 40 percent less in surface temperature than the temperature of the hot plastic sheeting. The heated mandrel is being rotated a rate of speed of two revolutions per minute on a 9 foot diameter mandrel.

Heated plastic sheeting is extruded from an extruder in a spiral manner on the heated mandrel at a variable temperature 400 degrees Fahrenheit without deforming or becoming soluble.

A first layer of heated polymer is wrapped while being compressed over the turning heated mandrel wherein the first band of hot plastic disposed as overlapping wrapping on the turning mandrel or until 80 percent of the surface of the turning mandrel is covered in the layers of heated polymer forming a compressed continuous one piece sheath.

A mesh layer is disposed over the compressed continuous sheath encapsulating the cylinder on the turning mandrel while simultaneously laying a second layer of heated polymer over the turning mandrel ¼ inch thickness with a width of 4 inches and compressing the layer of heated polymer into the mesh layer and the mesh layer into the first layer of heated polymer simultaneously.

The layering of the heated polymer and mesh layer is repeating until a wall thickness is reached, wherein a quantity of layers of heated polymer are equal to or greater than the layers of mesh layer.

The final layer of the one piece integral wound tank can be a heated polymer layer creating a one piece integral continuous wall tank.

While hot, the one piece integral continuous wall tank is removed from the mandrel by collapsing the metal (decreasing the diameter of the metal mandrel), which allows the heated mandrel to be removed out of the heated plastic cylinder.

A warm one piece integral continuous wall square tank is formed by putting the plastic cylinder into a rectangular jig that is a bit smaller dimension than the cross section of the tank that will hold the one piece integral continuous wall square tank.

The warm one piece integral continuous wall square tank is cooled. A top plate and bottom pan of a sheet similar to the material used to make the tank is extrusion welded to an outside surface of the tank enclosing the tank. The top plate and the bottom pan are supported with at least one rib providing pressure control to the interior of the square tank.

EXAMPLE TWO

A reduced plastic content one piece integral wound tank is made by initiating a turning of a heated mandrel that is heated to a temperature of 40 percent less in surface temperature than the temperature of the hot plastic sheeting. The heated mandrel is being rotated a rate of speed of four revolutions per minute on a 5 foot diameter mandrel.

Heated plastic sheeting is extruded from an extruder in a spiral manner on the heated mandrel at a variable a temperature 400 Fahrenheit without deforming or becoming soluble.

A first layer of heated polymer is wrapped while being compressed over the turning heated mandrel wherein the first layer of heated polymer disposed as overlapping wrapping on the turning mandrel or until 75 percent of the surface of the turning mandrel is covered in the layers of heated polymer forming a compressed continuous one piece sheath.

A mesh layer is disposed over the compressed continuous sheath encapsulating the cylinder on the turning mandrel while simultaneously laying a second layer of heated polymer over the turning mandrel ½ inch thickness with a width of 6 inches and compressing the layer of heated polymer into the mesh layer and the mesh layer into the first layer of heated polymer simultaneously.

The layering of the heated polymer and mesh layer is repeating until a desired wall thickness is reached, wherein a quantity of layers of heated polymer are equal to or greater than mesh layer.

The final layer of the one piece integral wound tank can be a heated polymer layer creating a one piece integral continuous wall tank.

After cooling the one piece integral wall tank for 24 hours, the one piece integral continuous wall tank is removing from the mandrel forming a one piece integral continuous wall round tank.

A manway, a flange fitting, and the top plate and the bottom pan are added to complete the round tank.

The top plate and the bottom pan are supported with at least one rib or more providing pressure control to the interior of the round tank.

EXAMPLE THREE

A reduced plastic content one piece integral wound tank is made by initiating a turning of a heated mandrel that is heated to a temperature of 40 percent less in surface temperature than the temperature of the hot plastic sheeting. The heated mandrel is being rotated a rate of speed of ten revolutions per minute on a 2 foot diameter mandrel.

Heated plastic sheeting is extruded from an extruder in a spiral manner on the heated mandrel at a variable a temperature 450 Fahrenheit without deforming or becoming soluble.

A first layer of heated polymer is wrapped while being compressed over the turning heated mandrel wherein the first band of hot plastic disposed as overlapping wrapping on the turning mandrel or until 78 percent of the surface of the turning mandrel is covered in the layers of heated polymer forming a compressed continuous one piece sheath.

A mesh layer is disposed over the compressed continuous sheath encapsulating the cylinder on the turning mandrel while simultaneously laying a second layer of heated polymer over the turning mandrel ½ inch thickness with a width of 8 inches and compressing the layer of heated polymer into the mesh layer and the mesh layer into the first layer of heated polymer simultaneously.

The layering of the heated polymer and mesh layer is repeating until a desired wall thickness is reached, wherein a quantity of layers of heated polymer are equal to or greater than the mesh layer.

The final layer of the one piece integral wound tank can be a heated polymer layer creating a one piece integral continuous wall tank.

After cooling the one piece integral wall tank for 24 hours, the one piece integral continuous wall tank is removing from the mandrel forming a one piece integral continuous wall round tank.

A manway, a flange fitting, and the top plate and the bottom pan are added to complete the round tank.

The top plate and the bottom pan are supported with at least one rib providing pressure control to the interior of the round tank.

While these embodiments have been described with emphasis on the embodiments, it should be understood that within the scope of the appended claims, the embodiments might be practiced other than as specifically described herein.

Various aspects of the illustrative embodiments have been described using terms commonly employed by those skilled in the art to convey the substance of their work to others skilled in the art.

However, it will be apparent to those skilled in the art that the present invention may be practiced with only some of the described aspects. For purposes of explanation, specific numbers, materials and configurations have been set forth in order to provide a thorough understanding of the illustrative embodiments.

Various operations have been described as multiple discrete operations, in a manner that is most helpful in understanding the present invention; however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description.

What is claimed is:

1. An accelerated method for making a reduced plastic content hybrid polymer tank comprising:
   a. initiating turning of a heated mandrel heated to a temperature from 25 percent to 40 percent less in surface temperature than the temperature of heated polymer, the heated mandrel being rotated a rate of speed from 1 to 6 revolutions per minute;
   b. extruding the heated polymer from an extruder at a temperature from 400-460 Fahrenheit without deforming or becoming soluble;
   c. wrapping while compressing a first layer of heated polymer over the turning mandrel wherein the first layer of heated polymer is disposed as overlapping wrapping on the turning heated mandrel from one edge of the turning heated mandrel to the opposite edge of the turning heated mandrel until from 70 percent to 80 percent of the surface of the turning heated mandrel is covered with the first layer of heated polymer;
   d. disposing a mesh layer over the first layer of heated polymer on the turning heated mandrel while simultaneously laying a second layer of heated polymer over the turning heated mandrel with a width from 4 inches to 1½ feet and compressing the second layer of heated polymer into the mesh layer and the mesh layer into the first layer of heated polymer simultaneously;
   e. repeating the layering of the heated polymer and the mesh layer until a desired wall thickness is reached; wherein a quantity of layers of heated polymer are equal to or greater than the mesh layers, thus creating the cylinder; and
   f. performing one of the following to form a hybrid polymer tank:
      (i) while hot, removing the cylinder from the mandrel; forming one of a warm hybrid polymer oval, square, or rectangular cylinder tank; and cooling one of the warm hybrid polymer oval, square, or rectangular tank; or
      (ii) while cool, removing the cylinder from the mandrel, thus forming a hybrid polymer round tank.

2. The accelerated method for making the reduced plastic content hybrid polymer tank of claim 1, wherein the mesh layer has a pore size from ¼ inch long to 1 inch long, ¼ wide to 1 inch wide.

3. The accelerated method for making the reduced plastic content hybrid polymer tank of claim 1, wherein the mesh layer has a thickness from 0.4 mm to 2 mm.

4. The accelerated method for making the reduced plastic content hybrid polymer tank of claim 1, wherein the mesh layer comprises at least one of: carbon steel, carbon steel coated with zinc, galvanized steel; fiberglass, carbon graphite fabric, nylon, KEVLAR®, cotton fabric, or stainless steel.

5. The accelerated method for making the reduced plastic content hybrid polymer tank of claim 1, wherein the heated polymer consists of polypropylene, polyethylene, including homopolymers and copolymers thereof, polyvinyl chloride, carbon polyvinyl chloride, polystyrene, or ultra high molecular weight polyethylene.

6. The accelerated method for making the reduced plastic content hybrid polymer tank of claim 1, wherein a roller gang applies from 90 psi to 140 psi onto at least one of the mesh layers or onto the heated polymer layers.

7. The accelerated method for making the reduced plastic content hybrid polymer tank of claim 1, wherein a top plate and a bottom pan made from a polymer similar to the material used to make the hybrid polymer tank are welded to an outside surface of the hybrid polymer tank to close the hybrid polymer tank.

8. The accelerated method for making the reduced plastic content hybrid polymer tank of claim 7, wherein the top plate and the bottom pan are supported with at least one rib providing pressure control to the interior of the hybrid polymer tank.

9. The method for making the reduced plastic content hybrid polymer tank of claim 1, comprising the step of installing a manway into the hybrid polymer tank.

10. The accelerated method for making the reduced plastic content hybrid polymer tank of claim 9, comprising a step of installing the flange fittings into the hybrid polymer tank to allow ingress or egress of fluids, vapors or combinations thereof into or out of the formed tank.

11. The accelerated method for making the reduced plastic content hybrid polymer tank of claim 10, comprising a step of installing the hybrid polymer tank in a frac tank or a standard shipping container, wherein the sides of the shipping container and the sides of the frac tank are used to support integrity of the formed hybrid polymer tank.

12. The accelerated method for making the reduced plastic content hybrid polymer tank of claim 10, wherein forming the warm hybrid polymer oval, square, or rectangular cylinder tank comprises a step of transforming the cylinder from a round shape to one of a square shape, an oval shape, or a rectangular shape by putting the round shaped cylinder in a jig, and then inserting the formed hybrid polymer tank into a metal container to achieve over 95 percent volume of the metal container.

13. The accelerated method for making the reduced plastic content hybrid polymer tank of claim 10, the the hybrid polymer tank is seamless.

* * * * *